US007974830B2

(12) United States Patent
Sekine et al.

(10) Patent No.: US 7,974,830 B2
(45) Date of Patent: Jul. 5, 2011

(54) TAPE MANAGEMENT METHOD AND TAPE MANAGEMENT SYSTEM

(75) Inventors: Michiaki Sekine, Kawasaki (JP); Takeaki Murakoso, Hiratsuka (JP); Hiroyuki Takabayashi, Yokohama (JP); Norichika Hatabe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 12/021,413

(22) Filed: Jan. 29, 2008

(65) Prior Publication Data

US 2009/0132228 A1 May 21, 2009

(30) Foreign Application Priority Data

Nov. 20, 2007 (JP) ................................ 2007-300855

(51) Int. Cl.
*G06F 9/455* (2006.01)
*G06F 3/06* (2006.01)
*G06F 13/00* (2006.01)

(52) U.S. Cl. ................................ 703/24; 711/4; 711/100

(58) Field of Classification Search .................... 703/23, 703/24; 711/4, 100, 11, 114, 154
See application file for complete search history.

(56) References Cited

U.S. PATENT DOCUMENTS 6,490,648 B1    12/2002 Kaneda et al.
7,529,784 B2 *  5/2009 Kavuri et al. ................ 711/113

FOREIGN PATENT DOCUMENTS

JP            200134422 A        2/2001

* cited by examiner

*Primary Examiner* — Paul L Rodriguez
*Assistant Examiner* — Andre Pierre Louis
(74) *Attorney, Agent, or Firm* — Sughrue Mion, PLLC

(57) ABSTRACT

A tape management method capable of easily using a file on a virtual tape from a plurality of programs in a system virtually emulating a magnetic tape apparatus by a disk apparatus. When a use request is generated from other program to a volume of a virtual tape used by one program, a host computer generates and uses a volume of a temporal virtual tape and can thus permit the use of the temporal tape volume from a plurality of programs without drastically changing the specification of an existing tape interface. The volume of the virtual tape temporarily generated is generated in a virtual tape management table and a virtual tape file uses a file of the same type.

6 Claims, 12 Drawing Sheets

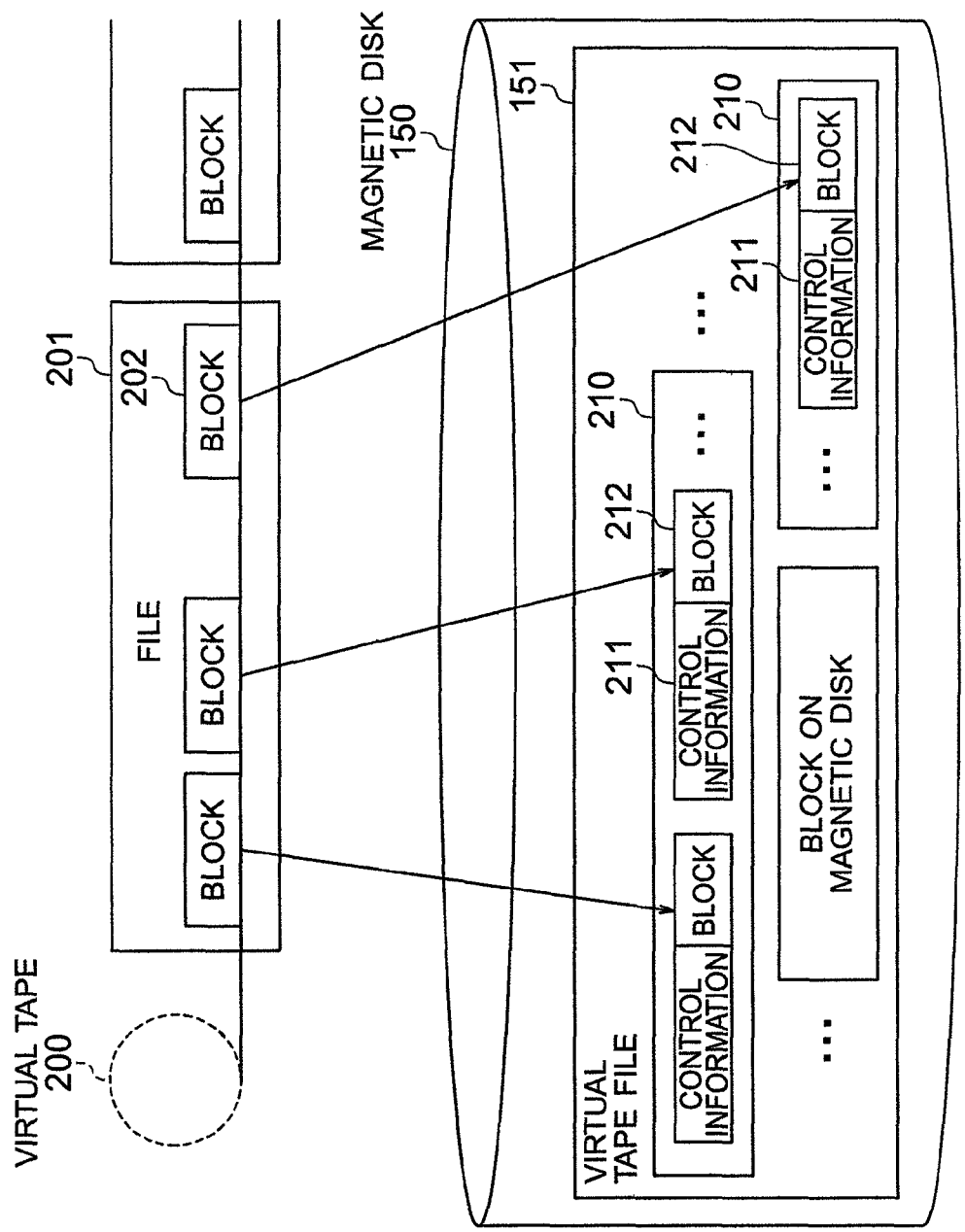

FIG. 4

144 FILE MANAGEMENT TABLE

| FILE NAME | EXCLUSIVE CONDITION | STORAGE SITE DISK NAME | REGISTERED VIRTUAL TAPE NAME |
|---|---|---|---|
| VTAPE1.DS1 | PRIVATE | DISK1 | VTAPE1 |
| VTAPE1.DS2 | NON-USE | DISK3 | VTAPE1 |
| VTAPE1.DS3 | NON-USE | DISK4 | VTAPE1 |
| VTAPE1.DS4 | NON-USE | DISK2 | VTAPE1 |
| VTAPE2.DS1 | SHARE | DISK1,DISK3 | VTAPE2 |
| VTAPE2.DS2 | NON-USE | DISK4,DISK2 | VTAPE2 |
| VTAPE2.DS3 | SHARE | DISK3 | VTAPE2 |

(300, 301, 302, 303)

145 VIRTUAL TAPE MANAGEMENT TABLE

| VOLUME NAME | EXCLUSIVE CONDITION | SIMULTANEOUS USE ATTRIBUTE | VIRTUAL TAPE FILE NAME |
|---|---|---|---|
| VTAPE1 | IN USE | ON | VTAPE1.DS1<br>VTAPE1.DS2<br>VTAPE1.DS3<br>VTAPE1.DS4 |
| VTAPE2 | IN USE | OFF | VTAPE2.DS1<br>VTAPE2.DS2<br>VTAPE2.DS3 |

(310, 311, 312, 313)

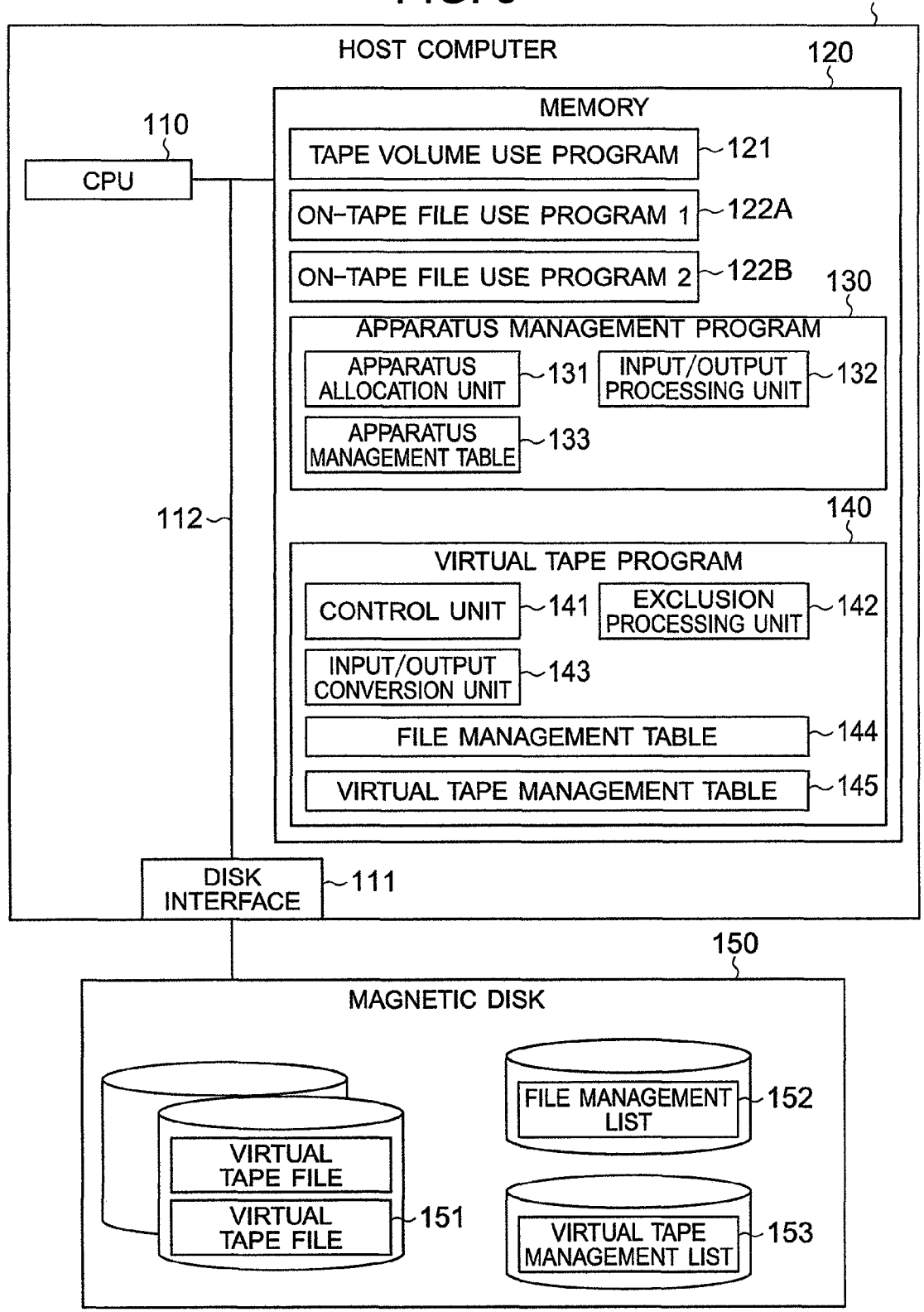

FIG. 6

144 FILE MANAGEMENT TABLE

| FILE NAME | EXCLUSIVE CONDITION | STORAGE SITE DISK NAME | REGISTERED VIRTUAL TAPE NAME |
|---|---|---|---|
| VTAPE1.DS1 | SHARE | DISK1 | VTAPE1 |
| VTAPE1.DS2 | PRIVATE | DISK3 | VTAPE1 |
| VTAPE1.DS3 | NON-USE | DISK4 | VTAPE1 |
| VTAPE1.DS4 | NON-USE | DISK2 | VTAPE1 |
| VTAPE2.DS1 | SHARE | DISK1,DISK3 | VTAPE2 |
| VTAPE2.DS2 | SHARE | DISK4,DISK2 | VTAPE2 |
| VTAPE2.DS3 | SHARE | DISK3 | VTAPE2 |

145 VIRTUAL TAPE MANAGEMENT TABLE

| VOLUME NAME | EXCLUSIVE CONDITION | SIMULTANEOUS USE ATTRIBUTE | VIRTUAL TAPE FILE NAME |
|---|---|---|---|
| VTAPE1 | IN USE | ON | VTAPE1.DS1<br>VTAPE1.DS2<br>VTAPE1.DS3<br>VTAPE1.DS4 |
| VTAPE2 | IN USE | OFF | VTAPE2.DS1<br>VTAPE2.DS2<br>VTAPE2.DS3 |
| WORK01 | IN USE | ON | VTAPE1.DS1<br>VTAPE1.DS2<br>VTAPE1.DS3<br>VTAPE1.DS4 |
| WORK02 | IN USE | ON | VTAPE1.DS1<br>VTAPE1.DS2<br>VTAPE1.DS3<br>VTAPE1.DS4 |
| ... | ... | ... | ... |

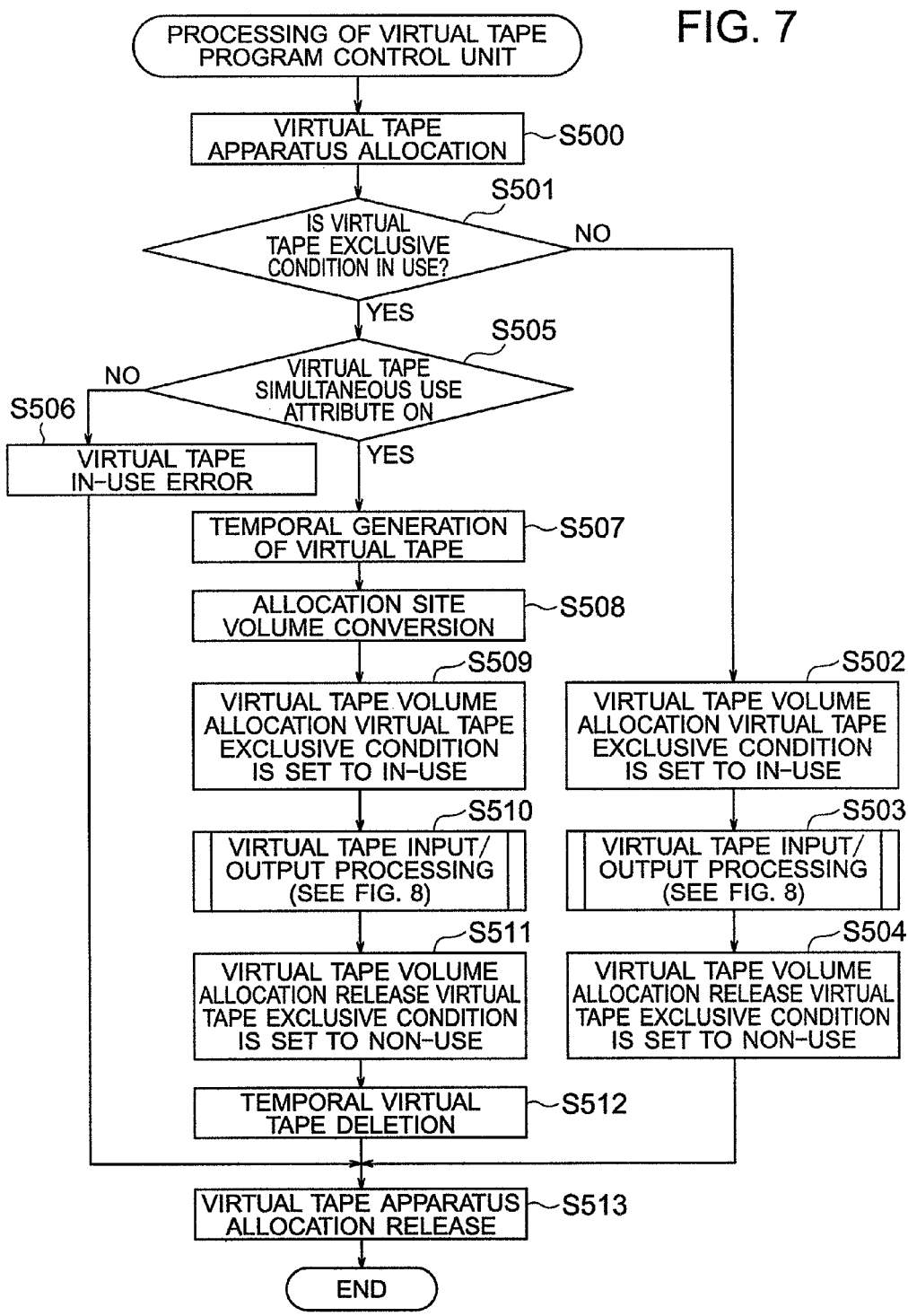

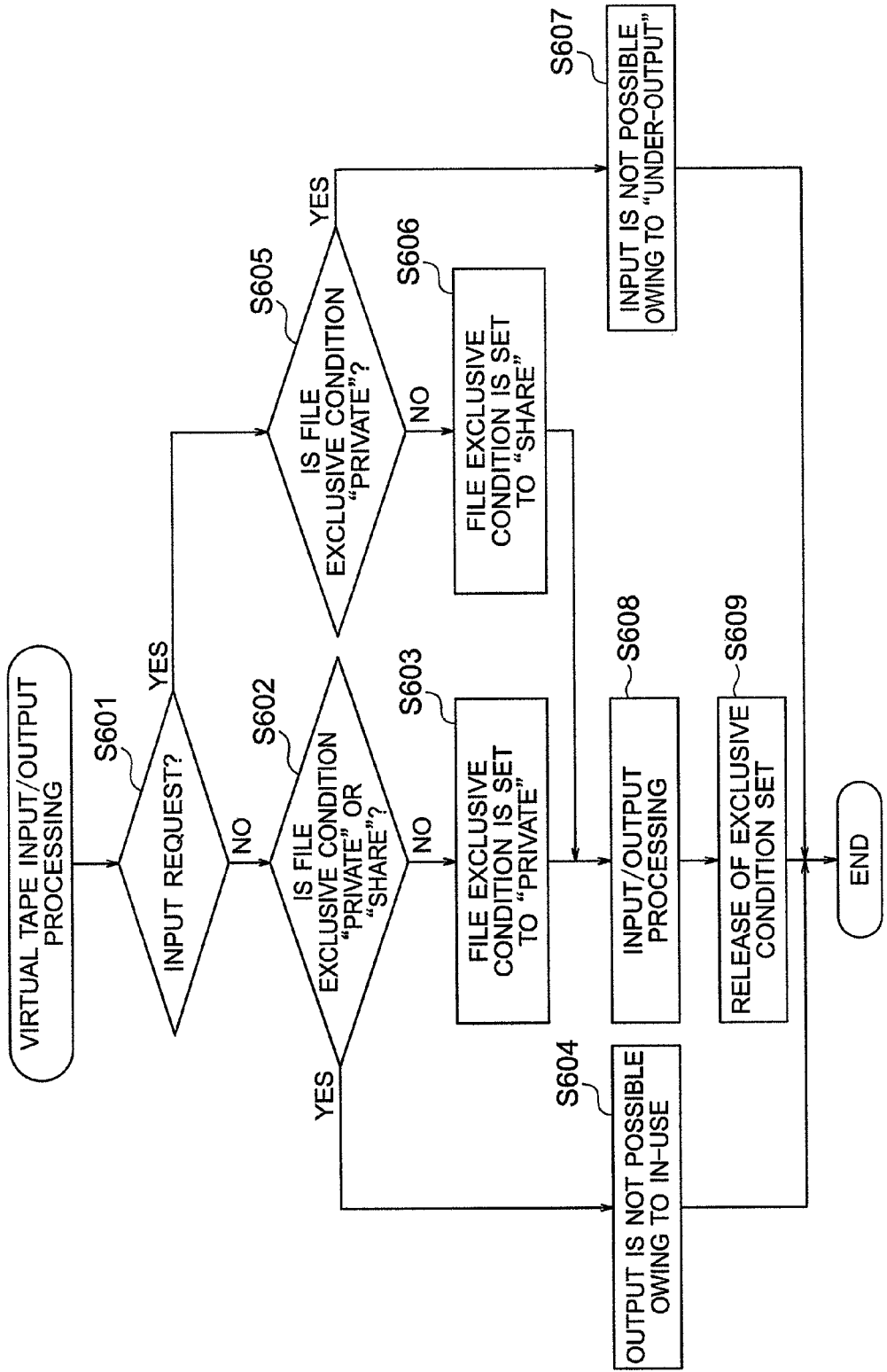

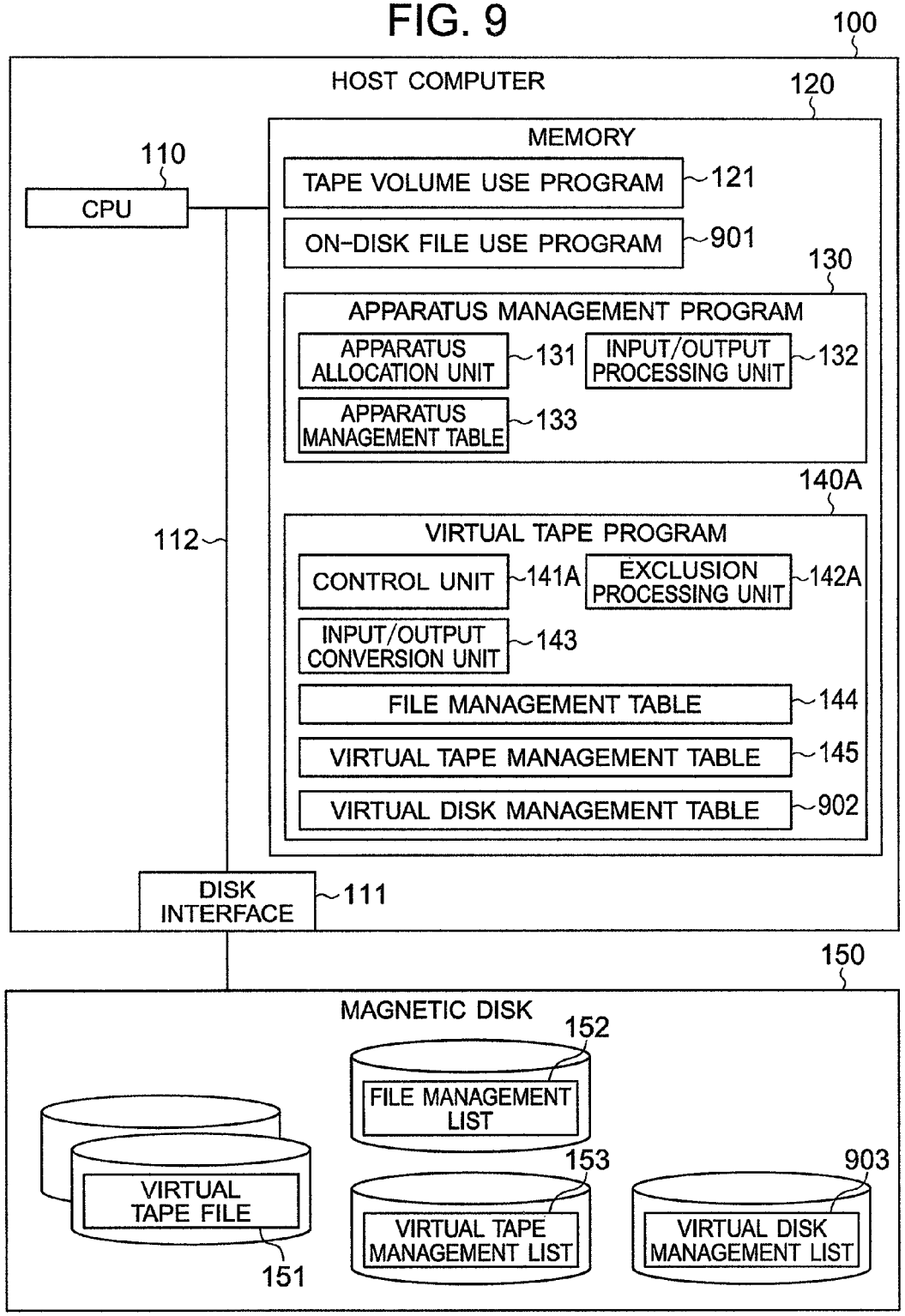

FIG. 11

144 FILE MANAGEMENT TABLE

| FILE NAME | EXCLUSIVE CONDITION | STORAGE SITE DISK NAME | REGISTERED VIRTUAL TAPE NAME |
|---|---|---|---|
| VTAPE1.DS1 | PRIVATE | DISK1 | VTAPE1 |
| VTAPE1.DS2 | NON-USE | DISK3 | VTAPE1 |
| VTAPE1.DS3 | NON-USE | DISK4 | VTAPE1 |
| VTAPE1.DS4 | NON-USE | DISK2 | VTAPE1 |

145 VIRTUAL TAPE MANAGEMENT TABLE

| VOLUME NAME | EXCLUSIVE CONDITION | SIMULTANEOUS USE ATTRIBUTE | VIRTUAL TAPE FILE NAME |
|---|---|---|---|
| VTAPE1 | IN USE | ON | VTAPE1.DS1<br>VTAPE1.DS2<br>VTAPE1.DS3<br>VTAPE1.DS4 |

902 VIRTUAL DISK MANAGEMENT TABLE

| VOLUME NAME | ON-VIRTUAL DISK FILE NAME | VIRTUAL TAPE FILE NAME |
|---|---|---|
| VDISK1 | TAPE1.DS1 | VTAPE1.DS1 |
| VDISK1 | TAPE1.DS4 | VTAPE1.DS4 |
| VDISK2 | TAPE1.DS2 | VTAPE1.DS2 |
| VDISK2 | TAPE1.DS3 | VTAPE1.DS3 |

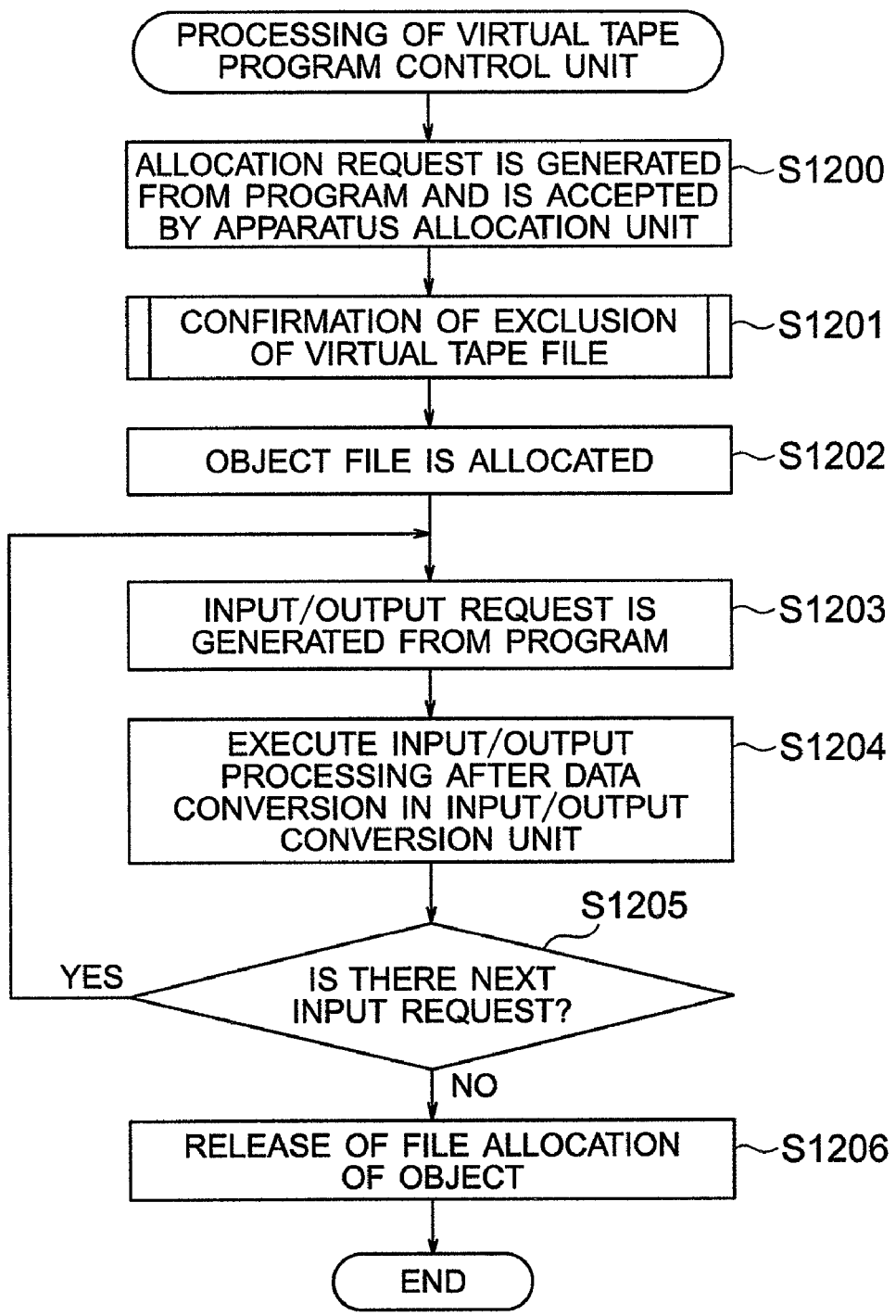

TAPE MANAGEMENT METHOD AND TAPE MANAGEMENT SYSTEM

INCORPORATION BY REFERENCE

The present application claims priority from Japanese application JP2007-300855 filed on Nov. 20, 2007, the content of which is hereby incorporated by reference into this application.

BACKGROUND OF THE INVENTION

This invention relates to a tape management method and a tape management system that can easily use a file on a virtual tape from a plurality of programs.

A magnetic tape is one of the recording media that have been used in the past but its access speed is lower when compared with magnetic disks or the like. Therefore, a virtual tape apparatus capable of gaining access at a higher speed than a practical magnetic tape has been developed in recent years by virtually emulating a tape apparatus on a magnetic disk apparatus that can make access at a higher speed.

To eliminate the necessity of a magnetic disk apparatus, U.S. Pat. No. 6,490,648 B1 discloses a virtual tape apparatus which includes a storage device for executing read/write from and to portable disk-like storage media and wherein the medium is mounted to the storage device for establishing connection with a host computer.

SUMMARY OF THE INVENTION

The virtual tape apparatus disclosed in the reference cited above involves the problem that the access speed is low when the medium is not mounted to the storage device because the medium must be mounted to the storage device.

In addition, complicated control is necessary for alternately controlling read requests when a plurality of read requests occurs simultaneously for the same medium.

To solve the problem described above, it is an object of the present invention to provide a tape management method and a tape management system that can easily use a file on a virtual tape from a plurality of programs.

The invention for accomplishing the object described above has its feature in that when a virtual tape is used from a program, definition of a virtual tape having the same construction as a virtual tape volume as an object is dynamically added in another name when the object virtual tape is in use by another program and an allocation site volume of the program is changed to the virtual name of another name added so that access can be made to the file on the virtual tape from a plurality of programs.

The invention makes it possible to easily use the file on the virtual tape from a plurality of programs.

BRIEF DESCRIPTION OF THE DRAWINGS

FIG. 2 is an explanatory view showing an example of storage of files of a virtual tape to a virtual tape file of a magnetic disk;

FIG. 4 is an explanatory view showing an example each of a file management table and a virtual tape management table;

FIG. 5 is a structural view showing a tape management system when a file on one virtual tape is simultaneously used from a plurality of programs;

FIG. 6 is an explanatory view showing another example each of the file management table and the virtual tape management table;

FIG. 7 is a flowchart showing a processing of a control portion by a virtual tape program;

FIG. 8 is a flowchart showing an input/output processing of a virtual tape;

FIG. 9 is a structural view showing a tape management system according to a second embodiment of the invention;

FIG. 11 is an explanatory view showing an example each of file management table, virtual tape management table and virtual disk management table; and FIG. 12 is a flowchart showing a processing for using the file on the virtual disk.

DESCRIPTION OF THE EMBODIMENTS

Preferred embodiments of the invention will be hereinafter explained in detail with reference to the accompanying drawings.

First Embodiment

Figure 1:
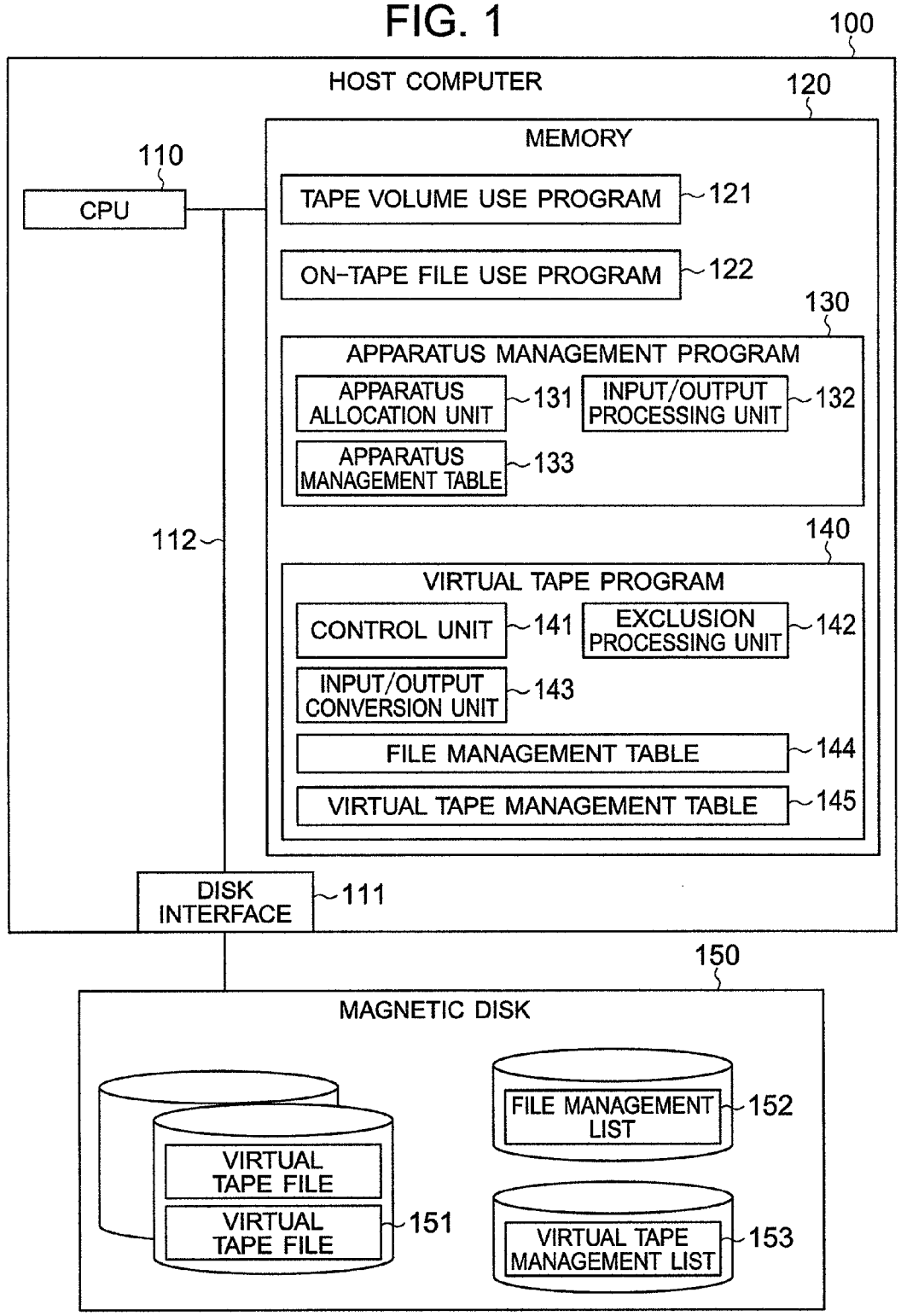
FIG. 1 is a structural view showing a tape management system according to a first embodiment of the invention.

FIG. 1 is a structural view showing a tape management system in a first embodiment of the invention. In the system construction shown in FIG. 1, a host computer 100 and a magnetic disk 150 are connected to each other through a disk interface 111. The host computer 100 is the computer a user uses and includes a CPU (Central Processing Unit) 110, a memory 120 and a bus 112 connecting these units. The CPU 110 executes various kinds of programs stored in the memory 120. The memory 120 stores various kinds of programs executed by the host computer 100 and temporal data. The magnetic disk 150 saves various kinds of data for the host computer 100 to execute the processing.

The memory 120 stores a tape volume use program 121, a file use program 122 on a tape, an apparatus management program 130 and a virtual tape program 140 and each function of each program is materialized when the CPU 110 executes these programs.

The tape volume use program 121 is a business program of the user using the tape without the necessity for taking the file into account by using a virtual tape apparatus connected to the host computer 100.

The file use program 122 on the tape is a business program of the user using the file on the tape by using the virtual tape apparatus connected to the host computer 100.

The apparatus management program 130 is a unit for executing various kinds of controls relating to devices connected to the host computer 100 and includes an apparatus allocation unit 131 for executing an allocation processing to the apparatus, an input/output processing unit 132 for executing an input/output processing to and from the apparatus and an apparatus management table 133 storing information of apparatuses connected to the host computer 100.

The virtual tape program 140 is a program for executing various kinds of controls relating to the virtual tape apparatus that is virtually connected to the host computer 100 and includes a virtual unit 141, an exclusion processing unit 142, an input/output conversion unit 143, a file management table 144 and a virtual tape management table 145.

The virtual tape program 140 manages the data of the virtual tape 200 (see FIG. 2) and is stored as a virtual tape file 151 for each file on the virtual tape 200 to the magnetic disk 150. The data of the file management table 144 is stored to a file management list 152 on the magnetic disk 150. The data of the virtual tape management table 145 is stored to a virtual tape management list 153 on the magnetic disk 150 and is read to the memory 120 when the virtual tape program is used.

The virtual tape apparatus is a logical device only definition of which exists as a tape apparatus existing on the apparatus management table 133. When the virtual tape apparatus is used, the input/output processing unit 132 of the apparatus management program 130 is not directly executed in the input/output processing to and from the tape after the allocation of the apparatus but the input/output to and from the tape is converted to the input/output to and from the magnetic disk 150 in the input/output conversion unit 143 of the virtual tape program 140 and the input/output operation to and from the virtual tape file 151 on the magnetic disk 150 is executed from the input/output processing unit 132 of the apparatus management program 130.

FIG. 2 is an explanatory view showing an example of storage of the file of the virtual tape into the virtual tape file of the magnetic disk. The file 201 of the virtual 200 is stored in the virtual tape file 151 of the magnetic disk 150 as shown in FIG. 2. Data of a block 202 on the virtual tape 200 is stored in a block 212 on the magnetic disk 150 after control information 211 storing a block order number 211, etc, on the virtual tape 200 is put.

As for the block 210 on the magnetic disk 150, a plurality of blocks 202 of the virtual tape 200 may be stored at this time or one block 202 of the virtual tape 200 may be dispersedly stored in a plurality of blocks 210 of the magnetic disk 150.

The file 201 on the virtual tape 200 may be set to the same block length as the block length of the virtual tape file 151 without adding the control information 211, and the virtual tape file 151 may be stored as the file on the magnetic disk 150 in the form that can be used as such.

Figure 3A:
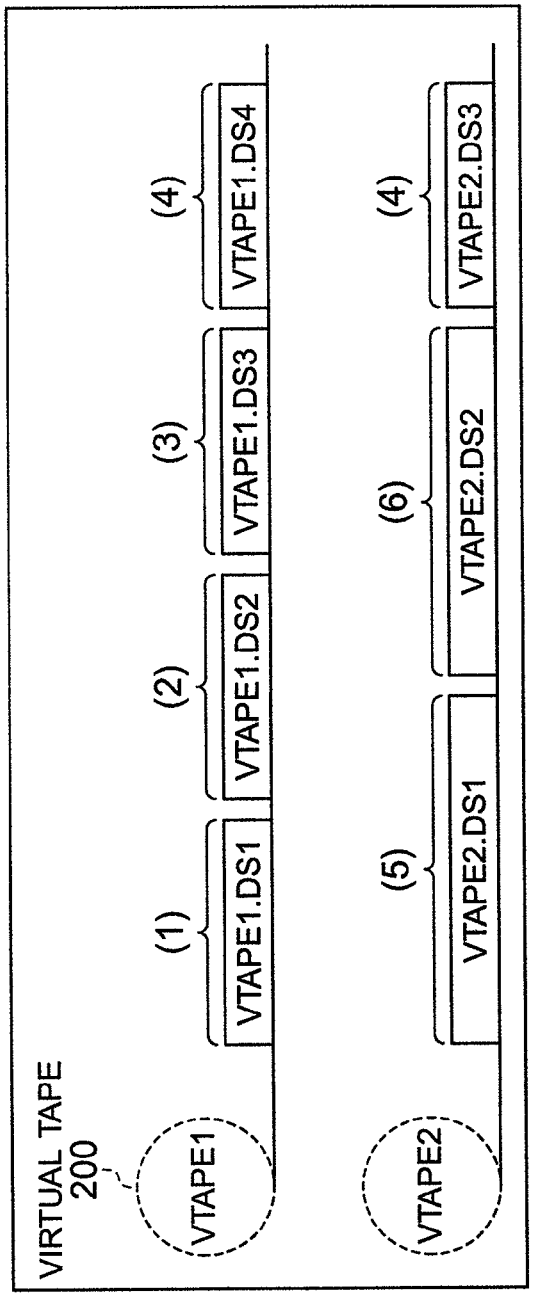
FIGS. 3A and 3B are explanatory views showing a file construction of the virtual tape and a storage site on the magnetic disk.
Figure 3B:
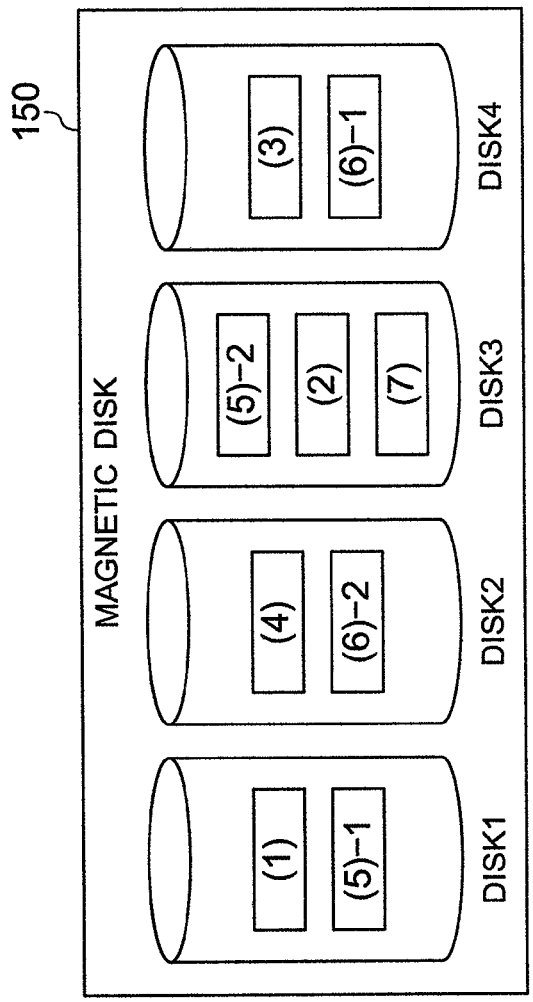

FIGS. 3A-3B are explanatory views showing a file construction of the virtual tape and the storing site on the magnetic disk. FIG. 3A shows the file construction of the virtual tape 200 and FIG. 3B shows the file construction of the magnetic disk 150. A virtual tape VTAPE1 as one of the virtual tape 200 includes a file VTAPE1•DS1 (file (1)), a file VTAPE1•DS2 (file (2)), a file VTAPE1•DS3 (file (3)) and a file VTAPE1•DS4 (file (4)). A virtual tape VTAPE2 as one of the virtual tape 200 includes a file VTAPE2•DS1 (file (5)), a file VTAPE2•DS2 (file (6)) and a file VTAPE2•DS3 (file (7)).

As shown in FIG. 3B, the files (1) to (7) are dispersedly stored in disks DISK1 to DISK4 inside the magnetic disk 150. The drawing represents that the file VTAPE2•DS1 of the file (5), in particular, is stored dividedly to the file (5)-1 on DISK1 and the file (5)-2 on the DISK3 on the magnetic disk 150. Similarly, the drawing represents that the file VTAPE2•DS2 of the file (6) is stored dividedly to the file (6)-2 on DISK2 and the file (6)-1 on the DISK4 on the magnetic disk 150.

FIG. 4 is an explanatory view showing an example each of the file management table and the virtual tape management table. In the file management table 144 (see FIG. 1), the files on the virtual tape 200 are outputted respectively to one or a plurality of magnetic disks 150 and manage the files on the magnetic disk 150. The file management table 144 has the information such as a file name 300 representing the name of the file on the magnetic disk 150, an exclusive condition 301 representing a use condition of the file, a storing site magnetic disk name 302 representing in which magnetic disk 150 the file is stored and a virtual tape name (registered virtual tape name) 303 representing which file on which virtual tape 200 the file indicates.

The virtual tape management table 145 is a table that manages the virtual tape 200 and includes a volume name 310 representing the name of the virtual tape 200, an exclusive condition 311 representing the use condition of the virtual tape 200, a simultaneous use attribute 312 representing that the file on the virtual tape 200 can be used from a plurality of programs, a virtual tape file name 313 representing the name of the file on the magnetic disk 150, and so forth.

FIG. 5 is a structural view showing the tape management system when the file on one virtual tape is simultaneously used from a plurality of programs. The difference from FIG. 1 resides in that the file use program on the tape is changed from the file use program 122 on the memory 120 to the file use program 1 (122A) on the tape and the file use program 2 (122B) on the tape. The rest of the constituent elements are the same as in the system construction shown in FIG. 1 and their explanation will be therefore omitted.

The file use program 1 (122A) is a user business program using the file VTAPE1•DS1 on the virtual tape TAPE1 by using the virtual tape apparatus connected to the host computer 100.

The file use program 2 (122B) is a user business program using the file VTAPE•DS2 on the virtual tape TAPE1 by using the virtual tape apparatus connected to the host computer 100.

The file use program 121 is a user business program using the file VTAPE2 without considering the file by using the virtual tape apparatus connected to the host computer 100.

FIG. 6 is an explanatory view showing another example of the file management table and the virtual tape management table. How the file management table 144 and the virtual tape management table 145 are set in the system construction shown in FIG. 5 will be explained.

When the file use program 1 (122A) on the tape uses the file VTAPE1•DS1 on the virtual tape (virtual tape volume) VTAPE1 for inputting, the exclusive condition 311 of the VTAPE1 of the virtual tape management table 145 is set to "in-use" from "non-use". The exclusive condition of the VTAPE1•DS1 of the file management table 144 is set to "share" from "non-use". The detailed setting method will be explained later with reference to FIGS. 7 and 8.

To use the virtual tape VTAPE1 by the file use program 2 (122B) on the tape while the virtual tape VTAPE1 is used by the file use program 1 (122A) on the tape, the definition of the temporal virtual tape volume WORK01 is added to the virtual tape management table 145 to convert the volume allocation of the file use program 2 (122B) on the tape to WORK01 from VTAPE1. The file on one virtual tape 200 can be used in this way from a plurality of programs.

Incidentally, the exclusion processing of the file on the virtual tape 200 is executed on the basis of the exclusive condition 301 of the file management table 144. When the tape volume use program 121 uses the virtual tape VTAPE2, the exclusive condition 311 of the virtual tape management table 145 is set to "in-use" as shown in FIG. 6. The exclusive condition 301 of all the files registered to VTAPE2 of the file management table 144 is set to "share".

The file on one virtual tape 200 can be simultaneously used from three or more programs. In such a case, the definition such as the temporal virtual tape volume WORK02, etc, is further added for using the file.

FIG. 7 is a flowchart showing the processing of the control unit by the virtual tape program. The processing of the virtual tape program 140 will be explained with reference to FIG. 5 when the virtual tape volume having the simultaneous use attribute is used by the tape volume use program 121.

The tape volume use program 121 generates an allocation request for using the virtual tape 200. The apparatus allocation unit 131 accepts the request and allocates the virtual tape apparatus (step S500).

To allocate the virtual tape volume after the allocation of the virtual tape apparatus, the control unit 141 of the virtual tape program 140 judges whether or not the virtual tape 200 is in use (step S501). When the virtual tape volume is out of use (step S501, No), the control unit 141 generates the allocation request to the apparatus allocation unit 131, allocates the virtual tape 200 in the same way as when the normal tape is in use, and sets the exclusive condition 311 of the virtual tape 200 to "in-use" (step S503, see FIG. 8). When the input/output processing is thereafter completed, the allocation of the virtual tape volume is released and the virtual tape exclusive condition is set to "non-use" (step S504). The flow then proceeds to step S513.

When the virtual tape volume is in use (step S501, Yes), the control unit 141 confirms the simultaneous use attribute 312 of the virtual tape (step S505). When the simultaneous use attribute 312 is OFF (step S505, No), the virtual tape 200 is judged as being under in-use error (an error when the exclusive condition of the virtual tape is in use and the simultaneous use attribute is not ON) (step S506), and the flow proceeds to the next step S513.

When the simultaneous use attribute 312 of the virtual tape 200 is ON (step S505, Yes), the control unit 141 generates temporarily and additionally the definition of the virtual tape volume (step S507) and converts the allocation destination volume of the program so as to use the virtual tape volume (step S508). The control unit 141 further sets the exclusive condition 311 of the virtual tape 200 to "in-use" for the virtual tape 200 of the allocation destination volume in the same way as the time of use of the normal tape (step S509). The exclusion processing is executed for the file on the virtual tape volume added afresh by confirming the exclusive condition when the input/output operation is made for the file by using the virtual tape file of the original virtual tape volume.

The control unit 141 executes the input/output processing (step S510, see FIG. 8) by using the input/output conversion unit 143. When the input/output processing is thereafter completed, the allocation of the virtual tube volume is released and the virtual tape exclusive condition is set to "non-use" (step S511). The control unit 141 deletes the virtual tape volume temporarily added at the end of the use of the virtual tape volume (step S512). Finally, the control unit 141 releases the allocation of the virtual tape apparatus (step S513) and finishes a series of processing.

FIG. 8 is a flowchart showing the input/output processing of the virtual tape. FIG. 8 shows the flowchart showing the exclusion processing when the file on the virtual tape is used. The procedure for judging whether or not an object file is usable at the time of allocation of the virtual tape file will be explained.

The control unit 141 judges whether the input/output request is the input request or the output request (step S601). When it is the input request (step S601, Yes), the control unit 141 judges whether or not the object virtual tape file 151 is usable from the exclusive condition 301 inside the file management table 144 by using the exclusion processing unit 142 (whether or not the exclusive condition 301 of the file is "private") (step S605). When the exclusive condition 301 of the file is private (step S605, Yes), the input operation is judged as being impossible because the virtual tape file is under output (step S607) and the processing is completed.

When the exclusive condition 301 of the file is other than private (step S605, No), the input operation is judged as possible. The exclusive condition 301 of the file is set to "share" (step S606) and the flow proceeds to step S608.

When the input/output request is not the input request in step S601, that is, when it is the output request (step S601, No), the control portion 141 judges from the exclusive condition 301 inside the file management table 144 by using the exclusion processing unit 142 whether or not the virtual tape file 151 is usable (whether or not the exclusive condition 301 of the file is private or share) (step S602). When the exclusive condition of the file is private or share (step S602, Yes), the output is judged as being impossible because the virtual tape file is "in use" (step S604), and the processing is completed. When the exclusive condition 301 of the file is not private or share (step S602, No), the output is judged as possible and the exclusive condition 301 of the file is set to "private" (step S603). The input/output processing is then executed (step S608) and setting of the exclusive condition 301 and after the input/output processing is completed, setting of the exclusive condition 301 set is released (step S609) and the processing is completed.

This embodiment demonstrates the tape management method when the virtual tape file 151 of the magnetic disk 150 is used from the program in the system in which the magnetic tape apparatus is virtually emulated by the magnetic disk 150. When a use request is generated from other program to the volume of the occupied virtual tape 200, the host computer 100 managing the magnetic disk 150 adds the management information of the work volume having the same construction as the volume of the virtual tape 200 to the virtual tape management table 145 and changes the volume to the work volume to which the allocation site volume of other program is added.

When the use request is generated from other program to the volume of the virtual tape 200 occupied by other program, this embodiment generates and uses the volume of the temporal virtual volume 200 and makes it possible to use the volume of the virtual tape 200 from a plurality of programs without the necessity for drastically changing the specification of the existing tape interface. As for the volume of the virtual tape 200 that is temporarily generated, only management information is generated and the same virtual tape file 151 is used. Incidentally, exclusion control is executed on the basis of the virtual tape management table 145 and the file management table 144 to use the tape as the normal virtual tape in the same way as in the prior art.

Second Embodiment

FIG. 9 is a structural view showing the tape management system according to the second embodiment of the invention. The embodiment wherein a file on the virtual tape 200 (see FIG. 2) is used not as the tape but as the file on the disk will be explained. In comparison with the first embodiment shown in FIG. 1, this embodiment has the construction in which the file use program 901 on the disk is stored in the memory 120 in place of the file use program 122 on the tape and a virtual management table 902 is provided to the virtual tape program 140A.

Data of the virtual disk management table 902 is stored in the virtual disk management list 903 on the magnetic disk 150 and is read to the memory 120 when the virtual tape apparatus system is used. A virtual magnetic disk apparatus (virtual disk apparatus; hereinafter called "virtual disk") is connected to the host computer 100 and the virtual tape program 140A executes various kinds of controls relating to the virtual disk.

The rest of the constituent elements are the same as those of the system construction shown n FIG. 1 and the explanation of such members will be omitted.

Figure 10A:
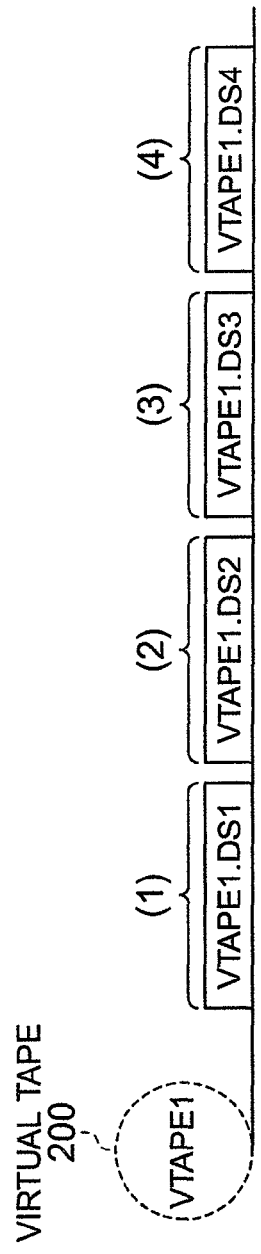
FIGS. 10A-10C are explanatory views showing a file construction of the virtual tape and a storage site on the magnetic disk.
Figure 10B:
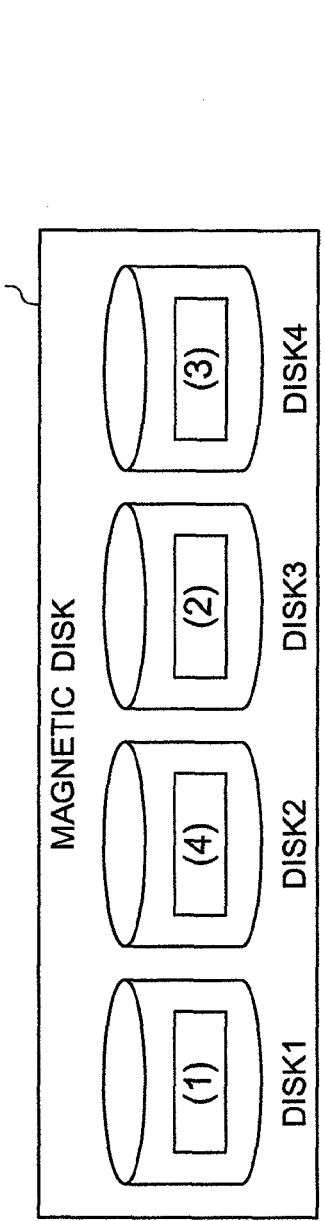
Figure 10C:
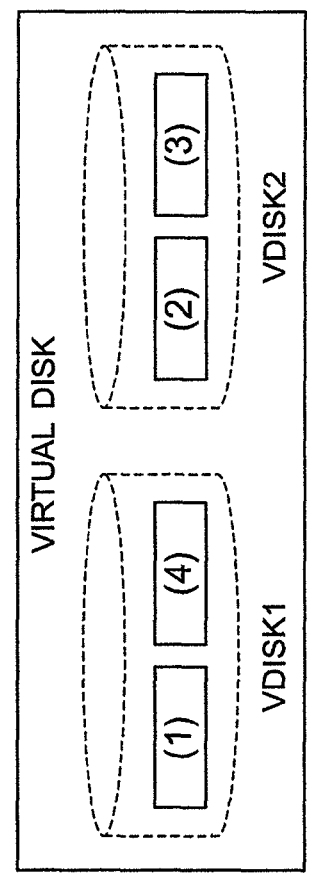

FIGS. 10A to 10C are explanatory views showing the file construction of the virtual tape and the storage sites on the magnetic disk and the virtual disk. FIG. 10A shows the file construction of the virtual tape 200, FIG. 10B shows the file construction of the magnetic disk 150 and FIG. 10C shows the file construction of the virtual disk. As shown in FIG. 10A, a virtual tape VTAPE1 as one of the virtual tape 200 includes a file VTAPE1•DS1 (file (1)), a file VTAPE1•DS2 (file (2)), a file VTAPE1•DS3 (file (3)) and a file VTAPE1•DS4 (file (4)).

As shown in FIG. 10B, the files (1) to (4) are dispersedly stored in disks DISK1 to DISK4 in the magnetic disk 150. As shown in FIG. 10C, the files (1) and (4) are stored in the volume VDISK1 in the virtual disk and the files (2) and (3) are stored in the volume VDISK2.

FIG. 11 is an explanatory view showing an example each of the file management table, the virtual tape management table and the virtual disk management table. Since the construction of tables of the file management table 144 and the virtual tape management table 145 is the same as in FIG. 4, the explanation will be omitted.

The virtual disk management table 902 is a table for managing the virtual disk and has a volume name 801 representing the name of the virtual disk, a file name 802 on the virtual disk, a virtual tape file name 803 representing the name of the file on the magnetic disk, and so forth. More concretely, the volume VDISK1 includes the files TAPE1•DS1 and TAPE1•DS4 on the virtual disk as shown in FIG. 10(c) and the TAPE1•DS1 and TAPE1•DS4 on each virtual disk are associated with the files VTAPE1•DS1 and VTAPE1•DS4 on the virtual tape.

FIG. 12 is a flowchart representing the processing for using the file on the virtual disk. The processing of the file use program 901 on the disk and the virtual tape program 140A will be explained when the file on the virtual disk is used by the file use program 901 on the disk.

The file use program 901 on the disk generates the allocation request for using the virtual disk and the apparatus allocation unit 131 accepts this request (step S1200). The virtual tape files storing the files on the virtual disk are confirmed by the virtual disk management table 902 and confirmation of exclusion of the virtual tape file is executed by the exclusion processing unit 142A (step S1201). When the virtual tape file is usable, the apparatus allocation unit 131 executes allocation of the virtual tape file (step S1202). When the virtual tape file is not usable, the processing of the file use program on the disk is completed.

Next, the file use program 901 on the disk generates the input/output request (step S1203). The input/output processing unit 132 hands over the control to the control unit 141 of the virtual tape program 140 without executing the input/output processing and input/output for the virtual disk is converted by the input/output conversion unit 143 to input/output for the magnetic disk. At this time, data conversion between the virtual disk and the magnetic disk is also conducted and the input/output processing is executed (step S1204). After the input/output processing is completed, whether or not the next input/output request exists is confirmed (step S1205). When the next input/output request does not exist (step S1205, No), the allocation of the virtual tape file is released by the apparatus allocation unit 131 (step S1206) and the processing of the file use program on the file is completed. When the input/output request exists (step S1205, Yes), the flow returns to step S1203.

Using the virtual disk, this embodiment can update only a part of the files on the virtual tape by conducting the input/output operation for only a part of a plurality of files outputted to the virtual tape without changing the other files of the same virtual tape.

In this embodiment, the virtual tape file 151 is stored in the magnetic disk 150 but may be stored in an optical disk, too, without the limitation of the kind of media. The optical disk is a recording medium that reads and writes information by means of reflection of light (semiconductor laser) by using an optical drive device.

The invention makes it possible to simultaneously use the files on the virtual tape from a plurality of programs for gaining access in the file unit of the tape without changing the tape interface used in the existing business programs, and can therefore speed up the business. The invention can also update a part of the files on the virtual tape by disposing the virtual disk management table.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A tape management method for using a plurality of files contained in a virtual tape on a disk apparatus from programs in a system virtually emulating a magnetic tape apparatus by said disk apparatus, wherein:
    a host for managing said disk apparatus is equipped with a storage unit having virtual tape management information including a first file name of a file contained in said virtual tape, a volume name to which said file belongs, attribute information for identifying permission of simultaneous use when the use of said virtual tape exists from a plurality of programs, and exclusive condition information for identifying whether or not said virtual tape is in use; wherein said tape management method comprising the steps of:
    setting said exclusive condition of the virtual tape management information to "in use" when receiving a use request of the file of said virtual tape;
    judging whether or not said attribute information is permitted when receiving further a use request of the file of said virtual tape when said file is in use;
    adding to said virtual tape management information, when said attribute information is permitted, another virtual tape management information including a second file name of the file contained in said virtual tape, wherein the second file name is different from the first file name, the volume name to which said file belongs, the attribute information for identifying permission of simultaneous use, and the exclusive condition information for identifying whether or not said virtual tape is in use, setting the exclusive condition information of said another virtual tape management information to "in use", executing input/output processing for the further use request of the file of said virtual tape; and releasing and deleting the allocation of said another virtual tape management information when said input/output processing is completed.

2. The tape management method according to claim 1, wherein said disk apparatus is a magnetic disk apparatus or an optical disk apparatus.

3. The tape management method according to claim 1, wherein said host, when receiving the further use request to said virtual tape, judges whether or not the file for the further use request is set to "private" in the exclusive condition information of said another virtual tape management, and finishes said further use request in the case of said "private".

4. The tape management method according to claim 1, wherein said host, when receiving the further use request to said virtual tape, judges whether or not the file for the further use request is set to "private" in the exclusive condition information of said another virtual tape management, and sets said the exclusive condition information of said another virtual tape management information to "share" when said object file is not "private".

5. The tape management method according to claim 1, wherein said host is equipped in said storage unit with a virtual disk apparatus and virtual disk management information, said virtual disk management information including a file name of a file of a virtual disk, a volume name to which said file belongs, and the first file name of the file contained in said virtual tape thereby for managing the file of said virtual tape of said disk apparatus in association with the file on said virtual disk apparatus, and executes an input/output processing to and from said virtual disk apparatus by executing conversion between said virtual disk apparatus and said virtual tape in association with each other on the basis of said virtual disk management information and said virtual tape management information.

6. A tape management system for using a plurality of files contained in a virtual tape on a disk apparatus from programs, comprising:
   a disk apparatus virtually emulating a magnetic tape apparatus;
   a host for managing the disk apparatus; and
   a storage unit having virtual tape management information including a first file name of a file contained in said virtual tape, a volume name to which said file belongs, attribute information for identifying permission of simultaneous use when the use of said virtual tape exists from a plurality of programs, and exclusive condition information for identifying whether or not said virtual tape is in use;
wherein the host:
sets said exclusive condition of the virtual tape management information to "in use" when receiving a use request of the file of said virtual tape;
judges whether or not said attribute information is permitted when receiving further a use request of the file of said virtual tape when said file is in use;
adds to said virtual tape management information, when said attribute information is permitted, another virtual tape management information including a second file name of the file contained in said virtual tape, wherein the second file name is different from the first file name, the volume name to which said file belongs, the attribute information for identifying permission of simultaneous use, and the exclusive condition information for identifying whether or not said virtual tape is in use, sets the exclusive condition information of said another virtual tape management information to "in use", executes input/output processing for the further use request of the file of said virtual tape; and releases and deletes the allocation of said another virtual tape management information when said input/output processing is completed.

* * * * *